| United States Patent [19] | [11] Patent Number: 4,755,418 |
| DebRoy et al. | [45] Date of Patent: Jul. 5, 1988 |

[54] NONYELLOWING CATHODIC ELECTROCOAT

[75] Inventors: Tapan K. DebRoy, Novi; Ding-Yu Chung, Farmington Hills, both of Mich.

[73] Assignee: BASF Corporation, Clifton, N.J.

[21] Appl. No.: 921,559

[22] Filed: Oct. 20, 1986

Related U.S. Application Data

[63] Continuation-in-part of Ser. No. 766,238, Aug. 12, 1985, abandoned.

[51] Int. Cl.$^4$ .................... C25D 13/06; B32B 7/02; B32B 27/38; B32G 15/08
[52] U.S. Cl. ......................... 428/215; 204/181.1; 204/181.7; 427/409; 427/410; 428/413; 428/418
[58] Field of Search ............ 204/181.1, 181.7; 427/407.1, 409, 410; 428/413, 418, 414, 215

[56] References Cited

U.S. PATENT DOCUMENTS

| 3,984,299 | 10/1976 | Jerabek | 204/181.7 |
| 4,038,232 | 7/1977 | Bosso et al. | 204/181.7 |
| 4,246,151 | 1/1981 | Dohy et al. | 204/181.7 |
| 4,345,004 | 8/1982 | Miyata et al. | 204/181.1 |
| 4,375,498 | 3/1983 | Le Minez et al. | 204/181.1 |
| 4,456,507 | 6/1984 | Kivel et al. | 204/181.1 |
| 4,508,767 | 4/1985 | Hokamura et al. | 427/410 |

*Primary Examiner*—John F. Niebling
*Assistant Examiner*—Ben C. Hsing
*Attorney, Agent, or Firm*—Emil Richard Skula

[57] ABSTRACT

A method of preventing the yellowing of the outermost coating of a multicoat coating system is disclosed. The method comprises initially depositing onto a conductive substrate by cathodic electrodeposition a primer coating comprising at least one layer of an amine-epoxy resin adduct and a cross-linking agent, and then curing said primer to a hard, durable film. Then, depositing a second coating onto the primer layer comprising at least one layer of a pigmented film-forming basecoat. Then depositing a third outermost coating onto the second coating comprising at least one layer of a clear, film-forming topcoat, and then curing the basecoat and topcoat. The primer coating contains a cross-linking agent selected from the group consisting of aliphatic polyisocyanates containing at least six carbon atoms, the isocyanurates of aliphatic polyisocyanates containing at least six carbon atoms, aromatic polyisocyanates having a molecular weight greater than 174, and the isocyanurates of aromatic diisocyanates having a molecular weight greater than 174. The polyisocyanates or isocyanurates are blocked with a blocking agent.

3 Claims, No Drawings

_(4,755,418)_

NONYELLOWING CATHODIC ELECTROCOAT

This is a continuation-in-part of copending application Ser. No. 766,238, filed on Aug. 12, 1985 now abandoned.

TECHNICAL FIELD

The field of art to which this invention pertains is epoxy resins, and, more specifically epoxy resin compositions containing cross-linking agents for use in cathodic electrodeposition coat processes.

BACKGROUND ART

Cathodic electrodepositable resin compositions are well known in the art. The use of electrodepositable resin compositions in aqueous electrodeposition baths and processes for coating objects in these aqueous cathodic electrodeposition baths are also well known in the art. The cathodic electrodepositable resin compositions conventionally used are amine-epoxy resin adducts mixed with a cross-linking agent and salted with an acid to form an aqueous principal emulsion. The aqueous principal emulsion is typically mixed at the coating site with a pigment paste, water, organic coalescent solvents, and other additives known in the art to form an aqueous electrodeposition bath. The bath is typically contained in an electrically insulated tank containing an anode. An article which is to be coated typically comprises an electrically conductive material. The article is connected to a direct current circuit to act as a cathode. When the article is immersed in the tank, the flow of electricity across the object causes the resin adduct and cross-linking agent of the principal emulsion as well as the pigment paste to be deposited on the surfaces of the article. When a sufficient thickness of coating has been deposited, the article is removed from the bath, optionally washed with distilled water, and then the article and film are cured to produce a smooth, hard, durable cross-linked coating.

Cathodic electrodepositable amine-epoxy resin adduct compositions, methods of manufacturing these cathodic electrodepositable resin compositions, aqueous electrodeposition baths and processes for the deposition of these resins from a bath onto a conductive object are disclosed in U.S. Pat. Nos. 3,984,299, 3,468,779, 4,116,900, 4,093,594, 4,137,140, 4,104,147, 4,225,478, 4,419,467, and 4,432,850.

Cathodic electrodepositable resin coatings provide a metal substrate with superior corrosion protection. These coatings are typically overcoated with a topcoat.

Topcoats are coatings applied for corrosion protection of a metal substrate, although the aesthetic appearance of the topcoat is also of equal importance. This is particularly true in the automobile industry where it is a requirement that the topcoat maintain its color, gloss, and durability for the lifetime of the automobile.

In the automotive industry, two significant systems of painting automobiles with a topcoat have been conventionally used. One topcoat system which utilizes thermoplastic resins is known as the acrylic lacquer system. In this system, the base polymers are the copolymers of methylmethacrylate and acrylic acid, methylacrylic acid, alkyd esters of acrylic acid or methylacrylic acid, vinyl acetate, akylol nitrile, styrene and the like. The acrylic lacquer topcoats have been acknowledged to have outstanding aesthetic properties but have poor chemical resistance and poor cracking and crazing resistance, among other disadvantages. The other topcoat system used in the automotive industry has been the thermosetting acrylic resins as described in U.S. Pat. No. 3,375,227 the disclosure of which is incorporated by reference. This other topcoat system has outstanding chemical resistance and outstanding resistance to cracking and crazing, among other outstanding properties, but to the expert paint formulator, the thermosetting acrylic resins do not quite provide the aesthetic properties obtained in the acrylic lacquer systems. Although both of these systems are used by automobile manufacturers to topcoat automobiles, there is a third system known as the basecoat/clear topcoat system which is replacing these systems. One basecoat/clear topcoat system is disclosed in U.S. Pat. No. 3,369,147, the disclosure of which is incorporated by reference. This topcoat system is an organic solvent based system, however, water based systems are also being used.

The basecoat/clear topcoat system provides a means of achieving a superior coating by retaining the superior aesthetic appearance of an acrylic lacquer system which is overcoated with a clear thermosetting resin having superior resistance to the environment.

It is known in the art that light colored basecoat/clear coat topcoats such as whites, light blues, creams, and tans, are subject to yellowing when deposited over baked cathodic electrically deposited amine-epoxy resin adduct coatings. The yellowing is predominant and pronounced near voids and cavities in the doors, frame and body of the automobile. In order to eliminate this yellowing, an extra primer/surfacer coat is typically applied between the electrocoat and the topcoat to physically isolate and seal the electrocoat from the topcoat.

The yellowing of topcoats applied over a cured electrodeposited amine-epoxy resin adduct coating is not limited to basecoat/clear coat coating systems. Yellowing can occur if the topcoat comprises a pigmented high solids lacquer, a pigmented nonaqueous dispersion lacquer, and other topcoat systems conventional in this art. However, the problem is especially severe with pigmented basecoat/clear topcoat coating systems. The yellowing of topcoats applied over an amine-epoxy resin adduct cathodic electrodeposited coating, typically referred to in this art as an "electrocoat" or "E-coat primer", is a problem which has not been solved in the art. The present method of preventing subsequently applied topcoat systems from yellowing is to seal the electrodeposited primer coating with a separate, additional primer sealer coat. This represents an additional, costly production step. The actual problem of preventing the electrocoat coating composition from yellowing the subsequently applied coating systems has not been addressed.

Accordingly, what is needed in this art is a method of coating substrates with an initial electrodeposited cathodic amine-epoxy resin adduct primer coating and a second outermost topcoat system such that the topcoat will not yellow, without the need for an additional primer/surfacer sealer coating between the electrodeposited coating and the topcoat.

DISCLOSURE OF INVENTION

A method of preventing the yellowing of the outermost coating of a multicoat coating system is disclosed. The method comprises initially depositing onto a conductive substrate by cathodic electrodeposition a primer coating comprising at least one layer of an amine-epoxy resin adduct and a cross-linking agent, and then curing said primer to a hard, durable film. Then, depositing a second coating onto the primer layer comprising at least one layer of a pigmented film-forming base coat; and, then depositing a third outermost coating onto the second coating comprising at least one layer of a clear, film-forming topcoat, and then curing the basecoat and topcoat. The primer coating contains a cross-linking agent selected from the group consisting of aliphatic polyisocyanates containing at least six carbon atoms, the isocyanurates of aliphatic polyisocyanates containing a least six carbon atoms, aromatic polyisocyanates having a molecular weight greater than 174, and the isocyanurates of aromatic diisocyanates having a molecular weight greater than 174. The polyisocyanates or isocyanurates are blocked with a blocking agent.

Yet another aspect of the present invention is a method of preventing the yellowing of the outermost coating of a multicoat coating system. The method comprises initially depositing onto a conductive substrate by cathodic electrodeposition a primer coating comprising at least one layer of an amine-epoxy resin adduct and a cross-linking agent, and curing said primer to a hard, durable film. Then, depositing a second outermost coating onto the primer layer comprising at least one layer of a pigmented film-forming topcoat, and curing the topcoat. The primer coating contains a cross-linking agent selected from the group consisting of aliphatic polyisocyanates containing at leat six carbon atoms, the isocyanurate of aliphatic polyisocyanates containing at least six carbon atoms, aromatic polyisocyanates having a molecular weight greater than 174, and the isocyanurates of aromatic polyisocyanates having a molecular weight greater than 174. The polyisocyanates or isocyanurates are blocked with a blocking agent.

BEST MODE FOR CARRYING OUT THE INVENTION

It is not clear why an electrocoat causes a subsequent directly applied topcoat to yellow. One possible explanation is that the yellowing is caused by the migration of certain components from the cathodic electrodeposited resin coating into the the topcoat such as the clear topcoat of a basecoat/clear coat topcoat coating system during the curing of the topcoat.

An aqueous electrodepositable cathodic coating bath is thought to comprise microscopic spheres of the aqueous principal emulsion. As previously mentioned, the principal emulsion comprises an amine-epoxy resin adduct blended with a cross-linking agent and salted with an acid to solubilize the adduct. Solubilization is believed to be an intermediate phase between a true suspension and a true solution, wherein the solubilized substance has characteristics of both states. When an article is being coated in an electrodeposition coating bath comprising the principal emulsion, it is believed that these spheres migrate to the surface of the conductive article and build up to form a film. Since the film is composed of these microscopic spheres, there will exist voids between the spheres and between the spheres and the surface of the conductive article.

In order to cure an electrodeposited coating, the article and electrodeposited film are typically baked at elevated temperatures. The curing process is typically a two-stage event. Initially, since the curing temperature is typically higher than the glass transition temperature of the resin adduct, the resin adduct spheres or particles which make up the film flow together as the film is heated to form a smooth coating, thereby eliminating most of the voids. It is important that the glass transition temperature be lower than the temperature at which cross-linking occurs to get a smooth film. The final stage of the cure is the cross-linking of the adduct. The cross-linking agent is typically blocked with a blocking agent. The blocking agent is designed to release in a specific temperature range, i.e., unblock, to permit the cross-linking agent to cross-link the resin adduct at a specific temperature. The blocking agents are typically volatile compounds containing an active hydrogen such as monopropylether of ethylene glycol, tertiary hydroxylamines, oximes, alcohols, phenols, and caprolactam.

It is believed that some of the blocking agents are not released during the electrocoat curing cycle and remain in the cured electrodeposited resin coating along with other residual high boiling components of the coating bath. It is believed that these volatile compounds as well as volatile free amines contained in the electrocoat primer coating then migrate into a subsequently applied topcoat overcoating such as a basecoat/clear coat system and cause the topcoat to yellow during the curing of the topcoat overcoating. In a basecoat/clear coat multicoat coating system, the clear topcoat has been observed to yellow causing an adverse change in the color of the system, particularly in the case of light colored basecoats such as whites, beiges, and the like. The problem is particularly severe around voids in doors, cavities in the body, etc. where it is believed that the volatized contaminants are trapped during the electrocoat cure and the topcoat cure and then condense on the topcoat during or immediately after curing, further aggravating the yellowing of the topcoat. The problem of yellowing has been observed to be of sufficient severity that is may no longer be possible to apply decorative basecoat/clear topcoat overcoatings directly onto a cathodic electrodeposited resin coating without aplying an intermediate primer/surfacer as an isolation barrier sealing the electrocoat from the topcoat system.

As previously mentioned, the multicoat coating systems which are the subject of the method of the present invention comprise firstly an electrodeposited cathodic electrocoat primer. The electrocoat primer coating comprises a cured amine-epoxy resin adduct cross-linked with a polyisocyanate or isocyanurate cross-linking agent. Applied directly to the cured electrocoat primer is a topcoat. The topcoat can be a conventional pigmented topcoat system, or preferably, a multi-layer topcoat system comprising a pigmented basecoat with a clear topcoat. The conventional topcoats which can be used in the practice of the present invention include any water-based or organic solvent-based thermoplastic or thermosetting topcoat systems comprising resins conventionally used in the art. The topcoat systems conventionally used in the art include thermoplastic acrylic lacquer systems. Other topcoat systems which may be used in the practice of the present invention include thermosetting resin systems such as thermosetting acrylic resins. In addition, topcoat systems based upon the following resin systems conventional in the art may be used thermosetting polyester polyurethane systems and two package polyurethane systems. It is preferred to use basecoat/clear topcoat coating systems in the present invention. One basecoat/clear coat topcoat system is disclosed in U.S. Pat. No. 3,369,147, the disclosure of which is incorporated by reference. Any basecoat, clear coat coating system conventional in the art may be used including systems referred to as nonaqueous dispersion systems. As previously mentioned, these paint systems are conventional in this art and readily available commercially.

Polyisocyanates or isocyanurates which may be used in the practice of the present invention include aliphatic polyisocyanates having at least six carbon atoms, the isocyanurates of aliphatic polyisocyanates having at least six carbon atoms, aromatic polyisocyanates having a molecular weight greater than 174, and the isocyanurates of aromatic polyisocyanates having a molecular weight greater than 174. The term polyisocyanate as used herein is defined to include isocyanurates.

The particular polyisocyanates used are those which are stable in the dispersion systems at ordinary room temperature and which react with the resinous product of this invention at elevated temperatures.

Representative examples are the aliphatic compounds such as hexamethylene, octamethylene diisocyanates and isophorone diisocyanate; the aromatic compounds such as 4,4'-diphenylene methane, 4,4'-toluidine, and 1,4-xylylene diisocyanates; the triisocyanates such as triphenyl methane-4,4'4'-triisocyanate, 1,3,5-triisocyanate benzene and 2,4,6-triisocyanate toluene; and the tetraisocyanates such as 4,4'-diphenyl-dimethyl methane-2,2', 5,5'-tetraisocyanate; the polymerized polyisocyanates such as tolylene diisocyanate dimers and trimers, polymethylenepolyphenylene polyisocyanates having NCO functionalities of 2 to 3, M-tetramethyl xylene diisocyanate, p-tetramethyl xylene diisocyanate and the like.

In addition, the organic polyisocyanate can be prepolymer derived from a polyol such as glycols, e.g. ethylene glycol and propylene glycol, as well as other polyols such as glycerol, trimethylolpropane, hexanetriol, pentaerythritol, and the like, as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Preferred polyisocyanates include the reaction product of isopherone diisocyanate (IPDI) and trimethylol propane and, the isocyanurate of hexamethylene diisocyanate. It is paticularly preferred in the practice of the present invention to use aliphatic polyisocyanates, although aromatic polyisocyanates as previously specified can be used. The aromatic polyisocyanates may not diminish yellowing as well as aliphatic polyisocyanates.

The blocking agents useful to form the blocked polyisocyanates of the present invention include these blocking agents conventional in this art such as alcohols, glycol ethers, oximes, amides, phenols and other materials typically used in this art as blocking agents having active hydrogens. It is particularly preferred to use as blocking agents 2-ethyl hexanol, ethylene glycol monohexyl ether, ethylene glycol monobutyl ether, ethylene glycol monopropyl ether, methyl ethyl ketoxime, methyl amyl ketoxime, and caprolactam.

The blocked polyisocyanates of this invention are formed by reacting sufficient quantities of a blocking agent with sufficient quantities of organic polyisocyanate at a sufficient temperature for a sufficient amount of time under reaction conditions conventional in this art such that no free isocyanate groups are present when the reaction has run its course. Typically about one equivalent of polyisocyanate is charged into a conventional reactor vessel. Typically about one equivalent to about two equivalents of blocking agent is added, preferably about one equivalent to about 1.1 equivalents. In addition one or more of the following compositions is charged into the reactor: methyl isobutyl ketone, butanol, methyl ethyl ketone, toluol, or an equivalent organic solvent.

The reaction temperature of the blocking reaction will vary with the type of polyisocyanate used, for example, when reacting polymethylene polyphenylene polyisocyanate with ethylene glycol monopropyl ether, the reaction is typically carried out at about 150° F. to about 220° F., more typically about 180° F. to about 220° F., and preferably about 200° F. to about 220° F. The reactor charge is mixed for about 15 minutes to about 120 minutes, more typically about 20 minutes to about 40 minutes, and preferably about 25 minutes to about 35 minutes. The blocked polyisocyanate is left in solution after the reaction is complete.

The cathodic electrodepositable coating compositions of this invention comprise amine-epoxy resin adduct which may optionally be chain-extended resulting in an increase in the molecular weight of the epoxy molecules by reacting with water miscible or water soluble polyols.

The epoxides useful in the practice of this invention are the polyepoxides typically used in this art and comprise a resinous material containing at least one epoxy group per molecule.

A particularly useful class of polyepoxides are the glycidyl polyethers of polyhydric phenols.

Such polyepoxide resins are derived from an epihalohydrin and a dihydric phenol and have an epoxide equivalent weight of about 400 to about 4,000. Examples of epihalohydrins are epichlorohydrin, epibromohydrin and epiiodohydrin with epichlorohydrin being preferred. Dihydrc phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxydiphenyl ethane, bis(2-hydroxynaphthylene) methane, 1,5-dihydroxynaphthylene and the like with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 450 to about 2,000, more typically about 800 to about 1,600 and preferably about 800 to about 1,500.

The polyepoxides used in the practice of this invention will have a relatively high molecular weight, that is, the molecular weight will typically be about 900 to about 4,000, more typically about 1,600 to about 3,200, and preferably about 1,600 to about 2,800.

Another quite useful class of polyepoxides are produced similarly from novolak resins or similar polyphenol resins.

Also suitable are the polyepoxides comprising similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis (4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid terephthalic acid, 2,6-naphthylane dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are nonphenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well known in the art.

Other epoxy-containing compounds and resins include nitrogeneous diepoxides such as disclosed in U.S. Pat. No. 3,365,471; epoxy resin from 1,1-methylene bis (5-substituted hydantoin), U.S. Pat. No. 3,391,097; bis-imide containing diepoxides, U.S. Pat. No. 3,450,711; epoxylated ammomethyldiphenyl oxides, U.S. Pat. No. 3,312,664; heterocyclic N,N'-diglycidyl compounds, U.S. Pat. No. 3,503,979; amino epoxy phosphonates, British Patent No. 1,172,916; 1,3,5-triglycidyl isocyanurates, as well as other epoxy-containing materials known in the art.

Although the blocked cross-linking agents of the present invention can be used successfully with conventional epoxy-amine resin adducts known in the cathodic electrodeposition art, it is preferable to use modified epoxy resin to prepare the amine-epoxy resin adducts. Specifically, the modified epoxy resins used in the practice of this invention will optionally comprise one of the aforementioned epoxy resin compositions chain extended with a water miscible or water soluble polyol, reacted with excess amine, and finally reacted with a fatty acid or aliphatic monoepoxide.

The water soluble or water miscible polyols, used to optionally chain extend epoxy resins, include organic polyols containing at least one and preferably two alcohol primary hydroxyls. Mixtures of organic polyols may be used in the practice of this invention, as well as mixtures of organic polyols and primary mono primary alcohols. These organic polyols will have a molecular weight of about 200 to about 3,000, more typically about 300 to about 1,000, and preferably about 400 to about 700.

Water miscible is defined as the ability or tendency of the polyol to mix or blend uniformly with water. By water soluble is meant the ability or tendency of the polyol to blend uniformly with water.

The organic polyols which are used in the practice of this invention are those known in the art, e.g. polyols disclosed in U.S. Pat. No. 4,104,147 which is incorporated by reference.

The water soluble or water miscible polyols which are used to generate the modified epoxy resins of this invention include the aliphatic polyols, the aromatic polyols, alkylene polyols, butadiene polyols, and butadiene acrylonitrile polyols.

Specific examples of the organic polyols used in the practice of this invention include Tone 200 brand polyol manufactured by Union Carbide Corp., Carbowax PG 300 and Carbowax PG 400 polyols manufactured by Union Carbide Corp., SynFac 8007 and SynFac 8008 brand polyols manufactured by Milliken Chemical Co., Spartanburg, S.C., and Hycar HTBN brand polyol manufactured by B.F. Goodrich Chemical Corp., Cleveland, Ohio. A particularly preferred polylol is SynFac 8008 brand.

The modification of the polyepoxide, that is, the chain extension and corresponding increase of molecular weight, is accomplished by mixing the organic polyol with the polyepoxide in an organic solvent, such as toluene, methyl isolbutyl ketone xylene, etc., and reacting these products at a sufficient temperature for a sufficient amount of time in a conventional reactor in the presence of a catalyst to completely react the polyepoxide. Typically, the reaction temperature will be about 200° F. to about 350° F., more typically about 250° F. to about 320° F., preferably about 260° F. to about 300° F.

Typically the reaction time is about 120 minutes to about 300 minutes, more typically about 160 minutes to about 260 minutes, preferably about 180 minutes to about 240 minutes.

Typically about 1.5 to 3 epoxide equivalents of polyepoxide are reacted, more typically about 2 to about 2.5, preferably about 2 equivalents with one equivalent of polyol. Examples of suitable catalysts include benzyl dimethylamine, triethylamine, triphenol phosphine, boron trifluoride, dimethylcyclohexylamine, and dimethylethanolamine or any Lewis acid.

The amines used in the practice of this invention are typical of those known in the art such as the polyamines disclosed in U.S. Pat. No. 4,139,510, which is incorporated by reference.

The polyamines which are reacted with the polyepoxide resins of this invention contain at least 2 amine nitrogen atoms per molecule, at least 3 amine hydrogen atoms per molecule and no other groups which are reactive with epoxide groups. These polyamines can be aliphatic, cycloaliphatic or aromatic and contain at least 2 carbon atoms per molecule. Useful polyamines contain about 2 to about 6 amine nitrogen atoms per molecule, 3 to about 8 amine hydrogen atoms and 2 to about 20 carbons atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, o,m and p-phenylene diamine 4,4'-methylene dianiline, menthane diamine, 1,4-diaminocyclohexane, methyl-aminopropylamine, and the like. Preferred amines for use in this invention are alkylene polyamines of the formula:

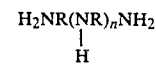

wherein n is a integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being triethylene tetramine, tetraethylene pentamine, and diethylene triamine.

Sufficient quantities of polyamine are reacted with sufficient quatities of modified polyepoxide resin so that the adduct formed contains about 1 mole of adducted polyamine molecule for each epoxide equivalent originally present in polyepoxide resin. The adducting reaction typically requires about 1.5 to about 15.0 moles of polyamine, i.e., an excess, for each epoxide equivalent of the polyepoxide resin, more typically about 2.0 moles to about 12.0 moles, and preferably about 3.0 moles to about 10.0 moles. Since excess polyamine is used, the excess unreacted polyamine must be removed by distillation after reaction to prevent gellation of the reaction product.

In preparing the modified epoxy-polyamine compositions sufficient quantities of polyamine are reacted with sufficient quantities of modified polyepoxide resin in a conventional reactor vessel for a sufficient period of time at a sufficient temperature to react all of the epoxide groups. Typically, the reaction temperature will be about 75° F. to about 220° F., more typically about 80° F. to about 190° F., and preferably about 140° F. to about 180° F. The reaction time is typically about five minutes to about 60 minutes, more typically about ten minutes to about 40 minutes, and preferably about 25 minutes to about 30 minutes. When the adducting reaction is complete, the unreacted or excess polyamine is removed by distillation with sufficient vacuum and at a sufficient temperature to remove the excess polyamine. Typical distillation temperatures are about 275° F. to about 500° F., more typically 320° F. to about 475° F. and preferably about 425° F. to about 450° F. Typical vacuums are about 60 mmHg to about 76 mmHg and preferably about 74 mmHg to about 76 mmHg.

Although the excess amine approach is preferred in the practice of the present invention to produce amine-epoxy resin adducts, other conventional methods of incorporating amines into the epoxide resin to form an amine-epoxy resin adduct can be used such as the ketimine approach and other amine incorporation methods known in this art.

Fatty acids which can be used, to optionally modify the epoxy resins and amine-epoxy resin adducts used in the practice of this invention, are monocarboxylic acids containing about 4 to 22 carbon atoms. The fatty acids may be saturated or unsaturated. the fatty acids are typical of those known in the art. Examples of such acids are caprylic acid, capric acid, stearic acid, benzoic acid, oleic acid, linoleic acid, linolenic acid and liconic acid. Such acids can be those derived from naturally occurring oils and which are named from the oil from which it is derived, e.g., linseed fatty acids, soya fatty acids, cottonseed fatty acids, coconut fatty acid and the like. A particularly preferred fatty acid is pelargonic acid.

The monoepoxides which can be used to optionally modify the epoxy resins and amine-epoxy resin adducts used in the practice of this invention contain one 1,2-epoxide group per molecule and about 6 to 24 carbon atoms per molecule. The monoepoxides used in the practice of this invention are typical of those known in the art such as the monoepoxides disclosed in U.S. Pat. No. 4,139,510 which is incorporated by reference.

Examples of monoepoxides are epoxidized hydrocarbons, epoxidized unsaturated fatty esters, monoglycidyl ethers of aliphatic alcohols and monoglydicyl esters of monocarboxylic acids. Examples of such monoepoxides are: epoxidized unsaturated hydrocarbons which contain 6 to 24 carbon atoms, e.g., octylene oxide; decylene oxide, dodecylene oxide and nonadecylene oxide, epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is incorporated by reference. Examples of such glycidyl esters are those derived from about 9 to about 19 carbon atoms, particularly Versatic 911 Acid, a product of Shell Oil Company, which acid contains 9 to 11 carbon atoms.

The monoepoxides or fatty acids are optionally reacted with the amine-epoxy resin adducts useful in the practice of the present invention to improve the electrical insulating properties of the deposited electrodepositable resin compositions of this invention. In addition, these components improve the properties of the deposited coating such as flexibility, corrosion resistance, and hardness.

Sufficient quantities of amine-epoxy resin adducts are mixed with sufficient quantities of fatty acid or monoepoxide in an organic solvent such as xylene, or toluene in a conventional reactor vessel for a sufficient period of time at a sufficient temperature to complete the reaction. Typically about one mole of amine-epoxy resin adduct is reacted with the following amounts of fatty acid or monoepoxide.

When fatty acid is the reactant, typically about 0.5 moles to about 2.75 moles of fatty acid are reacted with the adduct, more typically about 1 mole to about 2.25 moles, and preferably about 1 mole to about 2 moles. The reaction temperature is typically about 300° F. to about 400° F., more typically about 325° F. to about 390° F., and preferably about 350° F. to about 375° F.; the reaction time is about 60 minutes to about 180 minutes, more typically about 60 minutes to about 140 minutes and preferably about 120 minutes, or until the acid value is reduced to below about 6.

When monoepoxide is the reactant, typically about 0.5 mole to about 2.25 moles of monoepoxide are reacted with the adduct, more typically about 1 mole to about 2.25 moles, preferably about 1 mole to about 2 moles. The reaction temperature is typically about 150° F. to about 300° F., more typicaly about 150° F. to about 280° F., and preferably about 150° F. to about 250° F.; reaction times are typically about 60 minutes to about 180 minutes, more typically about 60 minutes to about 150 minutes, and preferably about 60 minutes to about 100 minutes.

Sufficient quantities of blocked cross-linking agent are incorporated into the electrodepositable coating compositions of this invention such that the deposited coating will be completely cured upon baking and there will be no free isocyanate groups remaining. Typically, about 20 wt. % to about 80 wt. % of the cross-linking agent is incorporated based upon the total weight of epoxide resin-amine adduct composition and cross-linking agent, more typically about 30 wt. % to about 70 wt. %, preferably about 35 wt. % to about 45 wt. %.

The blocked cross-linking agents of this invention are mixed with the amine-epoxy resin adduct compositions, preferably the optionally modified epoxy-polyamine-fatty acid or epoxy-polyamine-monoepoxide reaction products, by adding the blocked polyisocyanates to a reactor containing the amine-epoxy resin adduct composition and mixing the charge for about one-half hour.

In order to solubilize an amine-epoxy resin adduct composition, i.e., form a principal emulsion, it is necessary to salt the composition with a water soluble acid. The acids which can be used include those known in the artsuch as formic acid, acetic acid, phosphoric acid, lactic acid, hydrochloric acid, etc. Sufficient quantities of the acid are mixed with said adduct compositions to solubilize or disperse the resin water. One method in which the salting process is accomplished is by charging the amine-epoxy resin adduct composition, an acid, cosolvents, water and surfactants conventional in the art into a reactor vessel, and mixing the reactor charge with a slow speed mixer until the reaction has been completed. In a preferred method, acid, water, etc. are initially added to a reactor vessel, then the resin adduct is charged while the reactants are mixed with a slow speed mixer.

Although the blocked cross-linking agents of the present invention can be added prior to the acid salting step, it is preferred to add them after this step. Typically, the reaction temperature is about 25° F. to about 150° F., more typically about 100° F. to about 140° F., and preferably about 120° F. The reaction will be typically run for about 15 minutes to about 90 minutes, more typically about 25 minutes to about 80 minutes, and preferably 60.

Typically, about 0.1 Meq to about 0.8 Meq of acid is used per gram of solid resin, more typically about 0.2 Meq to about 0.7 Meq, and preferably about 0.2 Meq to about 0.5 Meq.

Electrodepositable cathodic coating compositions containing the blocked cross-linking agents of this invention are used in an electrodeposition process as an aqueous dispersion or a principal emulsion. Sufficient quantities of the resin composition in the form of a solubilized principal emulsion are used so that the concentration of the resin composition in an aqueous bath will produce a coating on an article of sufficient thickness so that upon baking the coating will have the desired characteristics such as smooth surface, high build, short coating time and low temperature cures. Typically, the concentration in an aqueous electrodeposition bath of the resin adduct compositions of this invention is about 10 wt. % to about 40 wt. %, more typically about 10 wt. % to about 30 wt. %, and preferably about 15 wt. % to about 25 wt. %.

It should be noted that the cathodic electrodepositable resin compositions are typically shipped by the manufacturer to the user as a salted aqueous dispersion or principal emulsion having a concentration of about 20 wt. % to about 36 wt. % of solids.

The cathodic electrodepositable coating baths of this invention are typically formed by mixing the aqueous solubilized (i.e., salted) cathodic electrodepositable resin adduct compositions or prinicipal emulsions of this invention in concentrate form with water, although dry resin could be used. The electrodeposition bath may contain additional ingredients such as pigments, coalescent solvents, antioxidants, surfactants, etc., which are typically used in electrodeposition processes known in the art. Pigment compositions may be of any conventional type and are one or more of such pigments as the iron oxides, the lead oxides, strontium chromate, carbon black, titanium dioxide, talc, barium sulphite, barium yellow, cadmium red, chromic green, lead silicate, etc. Sufficient quantities of pigment are used to achieve the appearance characteristics desired such as gloss, reflectance, hue, tint and other desired characteristics. Typically, the amount of pigment used is expressed in ratio of total pigment to total binder. Typically a pigment to binder ratio of about 0.1 to about 0.4 is used in the electrodepositable resin adduct compositions of the present invention, more typically about 0.15 to about 0.35, preferably about 0.2 to about 0.3. Pigment is typically added to the electrodeposition bath in paste form, i.e., predispersed in a composition comprising a pigment, an amine-epoxy resin adduct, and surfactants.

The electrodeposition baths may contain coalescent solvents which are water soluble or partially water soluble organic solvents for the resinous vehicles used in the practice of this invention. The coalescent solvents used in the practice of this invention are those typically used and known in the art.

Examples of such coalescent solvents include monomethyl ether ethylene glycol, monoethyl ether ethylene glycol, monobutylether, diethylene glycol monobutylether, ethanol, isopropanol, n-butanol, etc. Coalescent solvents are conventionally used so that a good emulsion resulting in a smooth deposited film is produced. Typically, the amount of coalescent solvents used in the coating baths of the present invention will be less than about 0.2 wt. % based on 25 wt. % solids of the bath. The use of coalescent solvents is optional.

The electrodeposition process typically takes place in an electrically insulated tank containing an electrically conductive anode which is attached to a direct current source. The size of the tank will depend on the size of the article to be coated. Typically, the tank is constructed of stainless steel or mild steel lined with a dielectric coating such as epoxy impregnated fiberglass or polypropylene. The electrodepositable cathodic resinous coating compositions of this invention are typically used tocoat articles such as automobile or truck bodies. The typical size of an electrodeposition bath tank used for this purpose is about 60,000 gallons to about 120,000 gallons.

Typically, a conductive article which is to be coated is connected to the direct current circuit so that the conductive article acts as the cathode. When the article is immersed in the coating bath, a flow of electrons from the cathode to the anode, that is, conventional current flow from the anode to the cathode, results in the particles of the dispersed cationic electrodepositable resin composition and blocked cross-linking agent (i.e., the amine-epoxy resin adduct and blocked cross-linker) and pigment paste being deposited on the surfaces of the article. The particles of the dispersed resin composition and pigment paste are positively charged and are therefore attracted to the negative cathodic surface of the object to be coated. The thickness of the coating deposited upon the object during its residence in the electric cathodic coating bath is a function of the cathodic electrodepositable resin composition, the voltage across the article, the current flux, the pH of the coating bath, the conductivity, the residence time, etc. Sufficient voltage will be applied to the coated article for a sufficient time to obtain a coating of sufficient thickness. Typically, the voltage applied across the coated article is about 50 volts to about 500 volts, more typically about 200 to about 350 volts, and preferably about 225 volts to about 300 volts. The current density is typically about 0.5 ampere per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film having sufficient resistance to corrosion and sufficient flexibility. The residence time or holding time is typically about 1 minute to about 3 minutes, more typically about 1 minute to about 2½minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically, the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,200 micro mhos, and preferably about 900 micro mhos to about 1,800 micro mhos.

The desirable coating thicknesses are sufficient to provide resistance to corrosion while having adequate flexibility. Typically, the film thicknesses of the coated objects of this invention will be about 0.4 mil to about 1.8 mils, more typically about 0.6 mil to about 1.6 mils, and preferably about 1.2 mils to about 1.4 mils.

The temperature of the coating bath is preferably maintained through cooling at a temperature less than about 86° F.

After the desired thickness of the coating has been deposited, the coated article is removed from the electrodeposition bath, optionally rinsed with deionized water, and cured. Typically, the electrodeposited coatings are cured in a conentional convection oven at a sufficient temperature for a sufficient length of time to unblock the blocked polyisocyanates and allow for cross-linking of the electrodepositable resin compositions. Typically, the coated articles will be baked at a temperature of about 200° F. to about 600° F., more typically about 250° F. to about 375° F., and preferably about 225° F. to about 350° F. The coated articles will be baked for a time period of about 10 minutes to about 40 minutes, more typically about ten minutes to about 35 minutes, and preferably about 15 minutes to about 30 minutes.

It is contemplated that the electrocoat primer coatings of the present invention may also be cured by using radiation, vapor curing, contact with heat transfer fluids, and equivalent methods.

The topcoat systems used in the multicoat coating systems of the present invention are applied in manners conventional in the art such as spraying, brushing, and the like to produce coatings of sufficient thicknesses conventional in this art. It is particularly preferred to apply the topcoats using paint spraying equipment. Typically, all topcoats are applied with conventional electrostatic turbo bell spraying equipment or conventional pneumatic spray equipment, or pressure pot spray equipment, all of which are commercially available and well known in the art. If the topcoat is a lacquer system, it is baked at about 250° F. to about 375° F. for about 30 minutes. If the topcoat is a thermosetting enamel system it is baked at about 250° F. to about 280° F. for about 30 minutes.

The preferred basecoat clear/coat topcoat system is applied in a conventional manner known in the art. A preferred method comprises using a conventional electrostatic turbo bell paint spraying system. The basecoat, having an approximate spray viscosity of 17 seconds in a Ford #4 cup, is sprayed to give a dry film thickness of 0.7–1.4 mils on the substrate. The clearcoat is similarly applied using electrostatic turbo bell paint spraying equipment after allowing a 2 or 3 minute flash or set-up of the wet basecoat, in a wet-on-wet application system. The clearcoat will have a viscosity of about 25 seconds in a Ford #4 cup. Sufficient paint is applied to produce a dry film thickness of about 1.2–1.8 mils. The clearcoat is typically flashed for a sufficient amount of time prior to baking. Bake temperature is typically about 250° for about 30 minutes.

Typically the coated articles of this invention will comprise conductive substrates such as metal, including steel, aluminum, copper, etc., however, most conductive substrates may be coated. The articles may comprise any shape the only limitation being whether the surfaces of the article can be wetted by the electrodeposition bath. The characteristics of the article which have an effect on the coating include the shape of the article, the capacity of the surfaces to be wetted by the coating solution, and the degree of shielding from the anode. Shielding is defined as the degree of interference with the electromotive field produced between the cathode and the anode, thereby preventing the coating composition from being deposited in those shielded areas. A measure of the ability of the coating bath to coat remote areas of the article is "throwpower". Throwpower is a function of the electrical configuration of the anode and cathode as well as the conductivity of the electrodeposition bath.

It should be noted that the articles which are coated in the practice of this invention are typically automobile bodies which have been pretreated to remove impurities and contaminants in a phosphatizing bath.

The following example is illustrative of the principles and practice of this invention, although not limited thereto. Parts and percentages where used are parts and percentages by weight.

EXAMPLE 1A

The following components were charged into a suitable reactor vessel:
 1658 parts of Epon 828 having an epoxy equivalent weight of 188;
 473 parts of Bisphenol A;
 583 parts of ethoxylated Bisphenol A having a hydroxy equivalent weight of 230 (Synfac 8009 from Milliken Chemical Co.); and
 147 parts of toluene.

The charge was heated to 145° C. under a dry nitrogen blanket and 3.8 parts benzyl dimethyl amine were then added to the reactor vessel. The reaction or mixture was further heated to 160° C., and held for 45 minutes. An additional 5.4 parts of benzyl dimethyl amine was added, and the mixture was held at 150° C. until the desired WPE (weight per epoxide) was achieved, then 1037 parts of toluene were added to the reactor to dilute the resulting epoxy adduct.

A conventional reactor equipped with an agitator, thermometer, nitrogen line and a condenser was charged with 900 parts of diethylene triamine. The diethylene triamine was slowly heated to 140° F. Then, 2869 parts of the epoxy adduct were slowly added to the reactor during a one-hour time period. After the epoxy adduct was completely charged, the mixture was heated to 180° F. and held for one hour. Next, the excess amine in the reactor mixture was vacuum distilled, condensed and removed by applying a vacuum of 75 mmHg and slowly raising the temperature of the reactor charge to 550° F. over a 2.5 hour time period. The mixture was held at this temperature until no more distillate was observed to be coming out. The temperature was then lowered to 360° F. and 283 parts of Pelargonic acid along with 200 parts of xylene were added to the reactor. The resulting mixture was heated to 360° F. and held at reflux until the acid value was down to 6. Then the reaction mixture was cooled down to ambient temperature and reduced to 71.4% with NV methyl isobutyl ketone.

EXAMPLE 1B

An ethylene glycol monopropyl ether blocked isocyanate cross-linker was prepared by slowly charging 870 parts of trimethylopropane into a suitable reactor vessel containing 3387 parts of an 80/20 isomer mixture of 2,4-/2,6-toluene diisocyanate (TDI), 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F. at which time 2026 parts of ethylene glycol monopropyl ether were added. The charge was maintained at 210° F. to 220° F. for one and one-half hours until essentially all of the isocyanate moiety was consumed as indicated by infrared scan. The batch was then thinned with methyl isobutyl ketone to 74% N.V.

EXAMPLE 1C

An ethylene glycol monohexyl ether blocked isocyanate cross-linker was prepared slowly charging 870 parts of trimethylopropane into a suitable reactor vessel containing 3387 parts of an 80/20 isomer mixture of 2,4-/2,6-toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F. at which time 2844 parts of ethylene glycol monohexyl ether were added. The charge was maintained at 210° F. to 220° F. for one and one-half hours until essentially all of the isocyanate moiety was consumed as indicated by infrared scan. The batch was then thinned with methyl isobutyl ketone to 74% N.V.

EXAMPLE 1D

An aliphatic caprolactam blocked isocyanate cross-linker was prepared by slowly charging a solution of 1680 parts of caprolactam, 665 parts of trimethylopropane, and 2467 parts of toluene into a suitable reactor vessel containing 3307 parts of isophorone diisocyanate (IPDI). The charge was held an additional hour at 150° F. Then, 14 parts of dibutyl tin dilaurate were added, and the charge was heated to 205° F. The charge was maintained at 210° F. to 220° F. for about one hour until essentially all of the isocyanate moiety was consumed as indicated by infrared scan. The batch was then thinned with methyl isobutyl ketone to 74% N.V.

EXAMPLE 1E

A caprolactam blocked aromatic isocyanate cross-linker was prepared by slowly charging 870 parts of trimethylopropane ito a suitable reactor vessel containing 3387 parts of an 80/20 isomer mixture of 2,4-/2,6-toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 160° F. at which time 2201 parts of caprolactam were added. The charge was maintained at 210° F. to 220° F. for about one and one-half hours until essentially all of the isocyanate moiety was consumed as indicated by the infrared scan. The batch was then thinned with methyl isobutyl ketone to 74% N.V.

EXAMPLE 1F

An acrylic anti-cratering agent was prepared by charging 44 parts of butyl acrylic, 15 parts of hydroxyethyl arcylic, 15 parts of dimethylaminoethyl methacrylic, 2 parts of styrene, 1 part of octyl mercaptan, 4 parts of VAZO 67, and 3 parts of acetone to a refluxing mixture of 13 parts of methyl isobutyl ketone and 2 parts of acetone over a four-hour period. After a 15 minute holding period, 0.145 parts of VAZO 67 and 1 part of methyl isobutyl ketone were added. The batch was maintained at the refluxing temperature for another hour.

EXAMPLE 1G-J

Emulsions were prepared by mixing 170 parts of the adduct of Example 1A, 6 parts of the anti-cratering agent of Example 1F, and 91 parts of the blocked cross-linking agents of Examples 1B, 1C, 1D and 1E, respectively, to 4 parts of acetic acid and 268 parts of deionized water under high agitation. After agitation for 5 days, the organic solvents were driven off. The following emulsions were prepared.

| Emulsions | Cross-linker | Isocyanate | Block Agent |
|---|---|---|---|
| 1G | 1B | TDI | ethylene glycol monopropyl ether |
| 1H | 1C | TDI | ethylene glycol monohexyl ether |
| 1I | 1D | IPDI | caprolactam |
| 1J | 1E | TDI | caprolactam |

EXAMPLE 1K

An adduct 1K and an adduct 1L are the two intermediates for the grinding vehicle. The adduct 1K was prepared by charging one mole of ethylene glycol monopropyl ether to one mole of 2,4-toluene diisocyanate under agitation with a dry nitrogen blanket. The reaction was maintained at a temperature below 100° F.

The charge was held an additional one and one-half hours.

EXAMPLE 1L

In a suitable reactor vessel, 455 parts of Triton X-102 TM (an alkylaryl polyether alcohol manufactured by Rohm and Haas, Philadelphia, Pa.) and 51 parts of methyl isobutyl ketone previously aqetroped to remove water, were added to 109 parts of 2,4 toluene diisocyanate. The reaction was maintained at 115° F. for two hours. Then 56 parts of dimethyl ethanolamine were charged, and the reaction was maintained at 160° F. for one hour. Finally, 50 parts of ethylene glycol monobutyl ether, 75 parts of lactic acid, and 89 parts of deionized water were charged, and the reaction was held at 190° F. for one hour.

EXAMPLE 1M

A grinding vehicle was prepared by charging 88 parts of the adduct of Example 1K to a reaction vessel containing 206 parts of EPON 1002F (WPE=650 manufactured by Shell Chemical Co., Houston, Tex.) and 39 parts of methyl isobutyl ketone. The reaction temperature was maintained at 250° F. for one hour. Then, 186 parts of ethylene glycol monobutyl ether, and 381 parts of adduct 1L, were added. The batch was maintained at 180° F. for four hours.

EXAMPLE 1N

A pigment paste was prepared by grinding 191 parts of the grinding vehicle of Example 1M, 16 parts of ethylene glycol monobutyl ether, 370 parts of deionized water, 306 parts of clay, 64 parts of $TiO_2$, 29 parts of lead silicate, 6 parts of carbon black, and 18 parts of dibutyl tin oxide in a steel ball mill for about 24 hours so that the average particle size of the mixture was about 12 microns.

EXAMPLE 2

Dispersions 2A, 2B, 2C and 2D suitable for electrodeposition baths were prepared comprising 539 parts of the emulsions of Examples 1G–1J respectively, 358 parts of deionized water, and 107 parts of the pigment paste of Example 1N by mixing in a suitable vessel with suitable mixing means. The dispersions had a P/B of 20/100, and total solids of 25%. After two weeks agitation, all organic solvent was driven off from the dispersions. The following dispersions were prepared.

| Dispersion | Emulsion | Isocyanate | Blocking Agent |
|---|---|---|---|
| 2A | 1G | TDI | ethylene glycol monopropyl ether |
| 2B | 1H | TDI | ethylene glycol monohexyl ether |
| 2C | 1I | IPDI | caprolactam |
| 2D | 1J | TDI | caprolactam |

EXAMPLE 3

Yellowing Test

One-half pint metal cans were electrocoated with the dispersions 2A–D, and the tops were sealed with aluminum foil to retain volatile components during the curing process which are believed to cause yellowing. The sealed cans were then baked at the temperatures indicated in the Table for 20 minutes, and allowed to cool. 4×12 inch steel panels were sprayed with a commercially available acrylic-melamine or melamine polyester white basecoat coating composition and a commercially available acrylic-melamine or melamine polyester clear coat coating composition, and were allowed a 15 minute flash. The aluminum foil was removed from the electrocoated cans as each can was inverted and placed immediately on one of the uncured 4×12 inch panels having the white basecoat and the clear topcoat. The cans and the panels were baked at a conventional topcoat system curing temperature for about 25 minutes. After the cans and the panels were removed from the oven and cooled, the cans were removed from the panels. The topcoat on each panel was visually observed for yelowing. The results are contained in the Table.

TABLE

| Sample | Cross-linker | Electrocoat Curing Temperatures | | | |
|---|---|---|---|---|---|
| | | 325° F. | 350° F. | 375° F. | 400° F. |
| 2A | TMP/TDI/ethylene glycol monopropyl ether | 7 | 7 | 2 | 1 |
| 2B | TMP/TDI/ethylene glycol monohexyl ether | 8 | 8 | 3 | 3 |
| 2C | TMP/IPDI/caprolactam | 9 | 9 | 9 | 9 |
| 2D | TMP/TDI/caprolactam | 8 | 7 | 3 | 2 |

Rating System 10 = no yellowing 1 = severe yellowing (poorest results)

The use of the blocked polyisocyanates of the present invention as cross-linking agents in cathodic electrocoat primers in the process of the present invention, surprisingly and unexpectedly, eliminates the yellowing of a subsequently applied topcoat system. The method of the present invention results in topcoats having improved aesthetic appearance and durability. It is now possible to eliminate or make optional the costly and time consuming application of a primer/surfacer over an electrocoat to act as a barrier to separate and isolate an electrocoat from a topcoat.

Although this invention has been shown and described with respect to detailed embodiments thereof, it will be understood by those skilled in the art that various changes in form and detail thereof may be made without departing from the spirit and scope of the claimed invention.

We claim:

1. A method of preventing the yellowing of the outermost clear coating of a multicoat top coat coating system comprising
   a. depositing onto a conductive substrate by cathodic electrodeposition a primer coating comprising at least one layer of an amine-epoxy resin adduct and a blocked cross-linking agent, and curing said primer coating to a hard durable film;
   b. depositing a pigmented base coat/clear outer coat coating system as a top coat onto the primer coating by initially depositing at least one layer of a pigmented film-forming base coat onto the primer, said base coat comprising pigment and resin, said base coat having a conventional viscosity and said base coat further having a dry film thickness of about 0.7 to about 1.4 mils, and then depositing directly onto the pigmented basecoat at least one layer of a clear film-forming outer coat, said clear coat having a dry film thickness of about 1.2 to about 1.8 mils, and then curing the base coat and clear coat to form the base coat/clear coat top coat coating, wherein the primer coating contains at least one blocked cross-linking agent selected from the group consisting of aliphatic polyisocyanates containing at least six carbon atoms, the isocyanurates of aliphatic polyisocyanates containing at least six carbon atoms, aromatic polyisocyanates having a molecular weight greater than 174, and the isocyanurates of aromatic diisocyanates having a molecular weight greater than 174, the polyisocyanate or isocyanurate blocked with a blocking agent.

2. The method of claim 1 wherein the blocking agent is selected from the group consisting of alcohols, glycol ethers, amides, oximes and phenols.

3. A coated substrate coated by the method of claim 1.

* * * * *